United States Patent [19]

Kanbe

[11] Patent Number: 5,369,759
[45] Date of Patent: Nov. 29, 1994

[54] CALL INFORMATION BASED MATCHING SYSTEM FOR STORED PROGRAM-CONTROLLED SWITCHING SYSTEM

[75] Inventor: Hiroyuki Kanbe, Kawasaki, Japan

[73] Assignee: Fujitsu Limited, Kawasaki, Japan

[21] Appl. No.: 930,998

[22] Filed: Aug. 17, 1992

[30] Foreign Application Priority Data

Aug. 16, 1991 [JP] Japan .................. 3-206042

[51] Int. Cl.⁵ .................. H04L 29/00; H04M 7/00
[52] U.S. Cl. .................. 395/575; 370/16; 370/121; 379/207; 379/279; 379/221; 364/238.1; 364/242.5; 364/937; 364/222.2; 364/DIG. 1; 364/DIG. 2; 364/222.3
[58] Field of Search ............. 370/16, 16.1; 375/121; 395/575; 379/207, 221, 279, 726

[56] References Cited

U.S. PATENT DOCUMENTS

| | | | |
|---|---|---|---|
| 3,754,127 | 8/1973 | Uno et al. ................. | 235/153 |
| 4,197,427 | 4/1980 | Hutcheson et al. .......... | 179/18 |
| 4,371,754 | 2/1983 | De et al. .................. | 371/9.1 |
| 4,403,286 | 9/1983 | Fry et al. ................. | 395/650 |
| 4,438,494 | 3/1984 | Budde et al. .............. | 395/575 |
| 4,455,645 | 6/1984 | Mijioka et al. ............ | 370/16 |
| 4,500,985 | 2/1985 | Chang ..................... | 370/14 |
| 4,527,266 | 7/1985 | Bogan et al. .............. | 370/16 |
| 4,555,595 | 11/1985 | Brightman et al. .......... | 379/284 |
| 4,633,039 | 12/1986 | Holden .................... | 379/32 |
| 4,736,319 | 4/1988 | Gupta et al. .............. | 379/269 |
| 4,769,834 | 9/1988 | Billinger et al. .......... | 379/112 |
| 4,817,094 | 3/1989 | Lebizay et al. ............ | 371/36 |
| 4,890,224 | 12/1989 | Fremont ................... | 370/16 |
| 5,043,875 | 9/1991 | Hall ....................... | 395/325 |
| 5,175,866 | 12/1992 | Childress et al. .......... | 455/8 |
| 5,239,537 | 8/1993 | Sakauchi .................. | 370/16 |
| 5,259,027 | 11/1993 | Winter et al. ............. | 379/221 |
| 5,311,572 | 5/1994 | Friedes et al. ............ | 379/67 |
| 5,311,576 | 5/1994 | Bronson et al. ............ | 379/89 |

*Primary Examiner*—Robert B. Harrell
*Assistant Examiner*—Timothy L. Philipp

[57] ABSTRACT

An apparatus and method for matching information between a first and a second processor to preserve a call includes determination units each provided in the respective processor. When a communications link experiences a fault, the determination units determines whether or not information items, respectively, in first and second processors, are to be preserved. A transmission unit notifies a match unit in a second processor of a determination of the call preservation. The match unit in the second processor compares the received information with an information to be preserved by the information of the second processor, and notifies the first processor of a result of a match or a non-match. A first initialization unit and a second initialization unit initialize their information items, respectively in the first and second processors, based on the result.

20 Claims, 14 Drawing Sheets

FIG. 6

CALL INFORMATION BASED MATCHING SYSTEM FOR STORED PROGRAM-CONTROLLED SWITCHING SYSTEM

BACKGROUND OF THE INVENTION

1. Field of the Invention

This invention pertains to a packet exchange and a stored program controlled switching system, and more particularly to a call information matching system for matching information on calls in call processors in the packet exchange when a severed communcations link is restored.

2. Description of the Related Art

FIG. 1 is a block diagram of a conventional stored program controlled-switching system (SPCS).

A stored program controlled switching system (SPCS) has a plurality of processors which handle the calls. An SPCS shown in FIGS. 1 & 2 comprises a line concentrator (LC), a digital switching module (DSM), a call processor (CPR) and a main processor (MPR). The line concentrator (LC) directly terminates plural pieces of terminal equipment (TE), multiplexes and transmits cells to intraoffice highways, performs a scan and signal distribution (SCN/SD) call control from each piece of the terminal equipment (TE) on a time slot sixteen (TS16) for an analog subscriber, and extracts D channel call control information for a digital subscriber. The switching module (DSM) switches a data frame, e.g. a packet or a cell, over to output highways. The call processor (CPR) performs a call control by commanding the switching digital module (DSM), based on call control information from the line concentrator (LC). The main processor (MPR) controls the entire exchange system and its communications with other offices.

For example, an eight megabit per second [8 Mbps] optical communications link connects the most subordinate processor with a subscriber loop carrier shelf (SLCSH) for accommodating an analog subscriber, having thirty-two [32] time slots every two megabits per second [2 Mbps]. A change in the scan and signal distribution call control (SCN/SD) detected by the hardware is notified as TS16 information to the most subordinate processor for its processing.

The line concentrator (LC) shown in FIG. 1 comprises a digital loop carrier shelf (DLCSH) for accommodating a digital subscriber, a subscriber loop carrier shelf (SLCSH) for accommodating an analog subscriber, a digital terminal shelf (DTSH) for accommodating a digital terminal, a signal controller (SGC) for exchanging TS16 data or D channel call control information, a line switch (LSW) for switching over to the signal controller (SGC) various input/output data from the digital loop carrier shelf (DLCSH), the subscriber loop carrier shelf (SLCSH) and the digital terminal shelf (DTSH), and a line processor (LPR) for supervising the line switch (LSW) and the signal controller (SGC).

In case of a digital loop carrier shelf (DLCSH), a D channel is one of time slots zero [0] (TSO), which is a time slot in an eight megabits per second (8 Mbps) optical communications link, as a link control access protocol for a D channel link (LAPD link) for use in a call processing control.

FIG. 2 is a sketch outlining a processor control by a stored program controlled-switching system (SPCS).

As described above, the line processor (LPR) controls communications with the terminal equipment (TE), the call processor (CPR) controls stored program communications and other services (such as numerical translations and connections), and the main processor (MPR) controls the switching system (SPCS).

It is still possible that statuses of calls controlled by these processors, do not match each other, when the processors resume a phase-B/C or when a communications link between the processors is restored. To overcome such a possibility, the prior art system is arranged such that the processors for call processing temporarily suspend all of their monitoring functions for matching calls on completion of a phase-B/C resumption or a communications link restoration, and then restart respective monitoring functions for detecting a subscriber action (e.g. an OFF-HOOK event and an ON-HOOK event) on completion of a matching process for preserving a call.

A phase resumption is to invoke a system initialization caused by a hardware fault or a software fault related to an intra-processor CC control. B/C refers to a severity of a fault.

FIG. 3 is a sequence diagram illustrating a conventional call preservation process.

More specifically, FIG. 3 shows in detail the procedure outlined in the description of FIG. 2.

Both, a superordinate processor (e.g. a call processor or a CPR) and a subordinate processor (e.g. a line processor or LPR) cover an interruption thereby ignoring a request for processing a subscriber action. Then, the superordinate processor creates lists of calls to be preserved and notifies the subordinate processor of the lists of the calls to be preserved. Each list itemizes a plurality of calls to be preserved. The subordinate processor determines whether or not a call in the list can be preserved by its own information items or pieces and notifies the superordinate processor of the determination in a matching result response.

After repeating the procedure for all the lists of calls to be preserved, both the superordinate processor and the subordinate processor initialize calls not to be preserved, thereby completing a call matching for preserving a call. Then, they announce a resumption of a call processing and restart respective monitoring functions.

However, a conventional call preservation process requires a considerable amount of time for matching call information held by the respective processors in addition to time required for communications between them. Currently, it requires about one [1] to two [2] minutes. Meantime, a subscriber action, such as a call origination, generated during the call preservation is completely blocked. The reason why the respective processors suspend their monitoring functions for all calls generated during the call preservation process through an exchange of lists of calls to be preserved between them is that the next process cannot be phased in by responding to a subscriber action without having a call preservation between the respective processors.

That is, the prior art has a problem that a user cannot expect a normal service immediately after a completion of a communications link restoration or a phase-B/C resumption, due to lack of response for a subscriber action such as a call origination.

SUMMARY OF THE INVENTION

It is an object of the present invention to reduce the time required for matching a call, to enable a call by a subscriber action generated during a call information matching to be processed immediately after a completion of a communications link restoration or a phase-B/C resumption, and to efficiently match all information items.

An information matching apparatus for use in an exchange has at least a first processor and a second processor. The first processor has a first determination unit, a transmission unit and a first initialization unit. The second processor has a second determination unit, a match unit and a second initialization unit. The first determination unit determines whether or not to preserve a non-matched call information by matching it with another call information in the first processor after a recovery from a status producing a non-matched call information. The transmission unit transmits to the second processor a call information determined by the first determination unit to be matched for a call preservation. The first initialization unit receives a matching result from the second processor, and initializes a call information corresponding to a result of matching, indicating a non-match. The second determination unit determines whether or not to preserve a non-matched call information by matching it with another call information in the second processor after a recovery from a status producing a non-matched call information. The match unit matches a call information transmitted from the transmission unit with a call information determined by the second determination unit, to be preserved and transmits a matching result to the first initialization unit. The second initialization unit initializes a call information corresponding to the matching result indicating a non-match obtained by the match unit.

BRIEF DESCRIPTION OF THE DRAWINGS

One of skill in the art can easily understand additional features and objects of this invention from the description of the preferred embodiments and some of the attached drawings. In the drawings:

FIG. 6 shows a field structure of a subscriber line control black (LCB);

DESCRIPTION OF THE PREFERRED EMBODIMENTS

This invention pertains to a call information matching system for use in the stored program controlled-switching system comprising a plurality of control processors, for example a first processor and a second processor.

Figure 1:
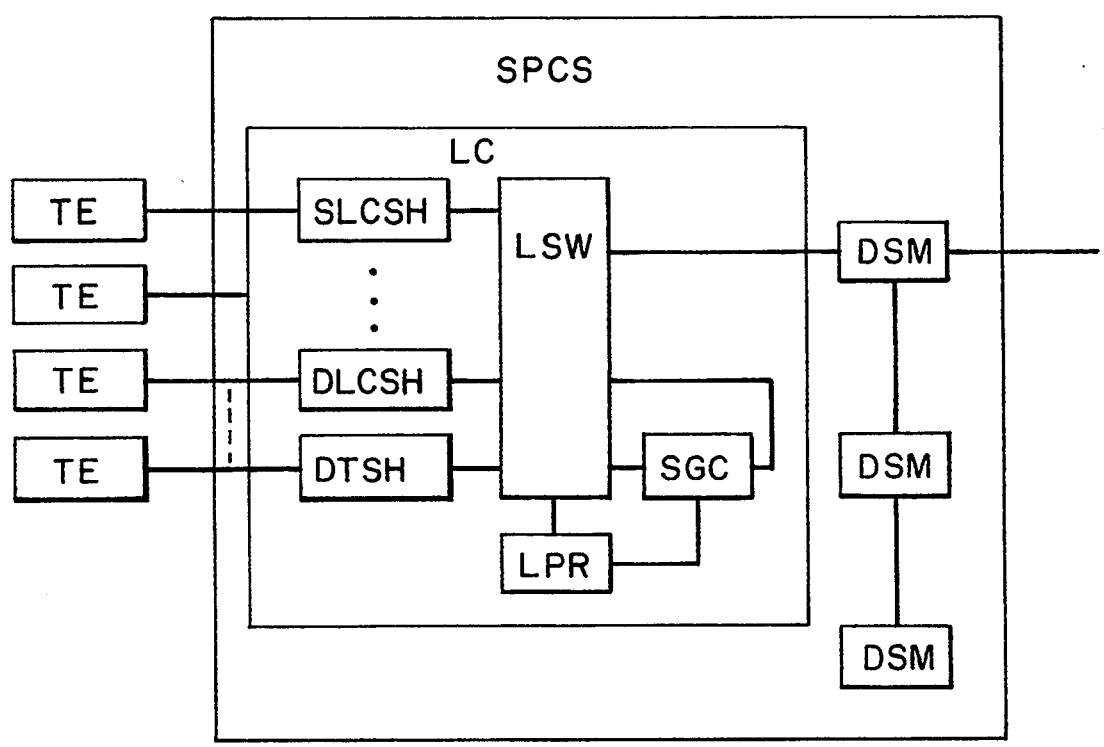
FIG. 1 is a block diagram of a conventional stored program-control led switching system (SPCS)
Figure 2:
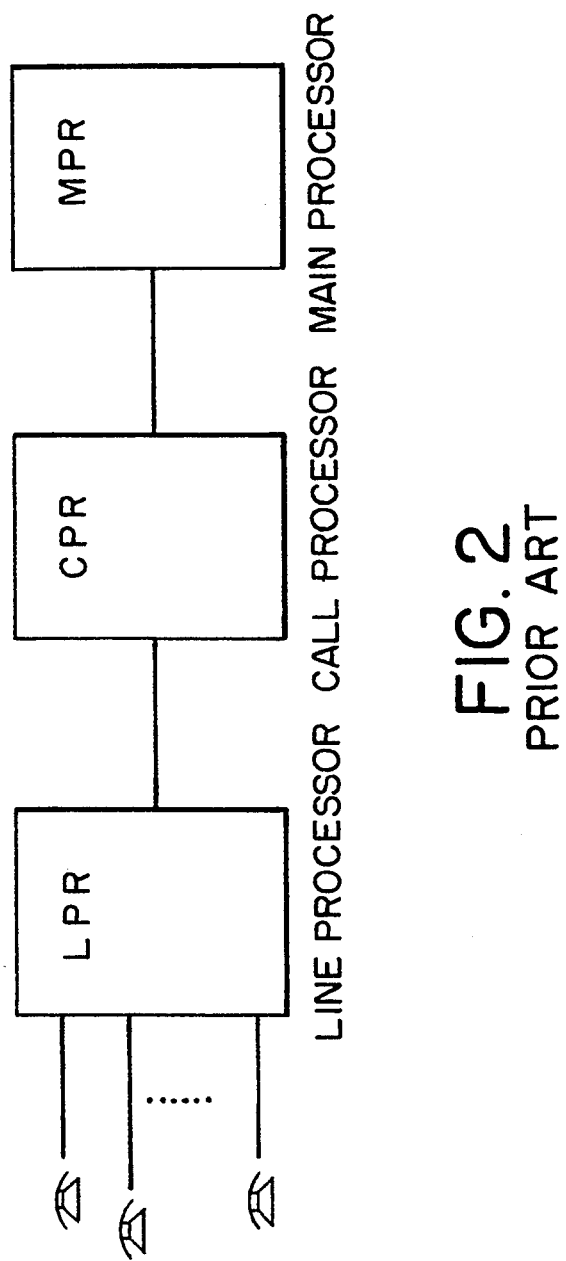
FIG. 2 is a sketch outlining a processor control by a stored program controlled-switching system (SPCS)
Figure 3:
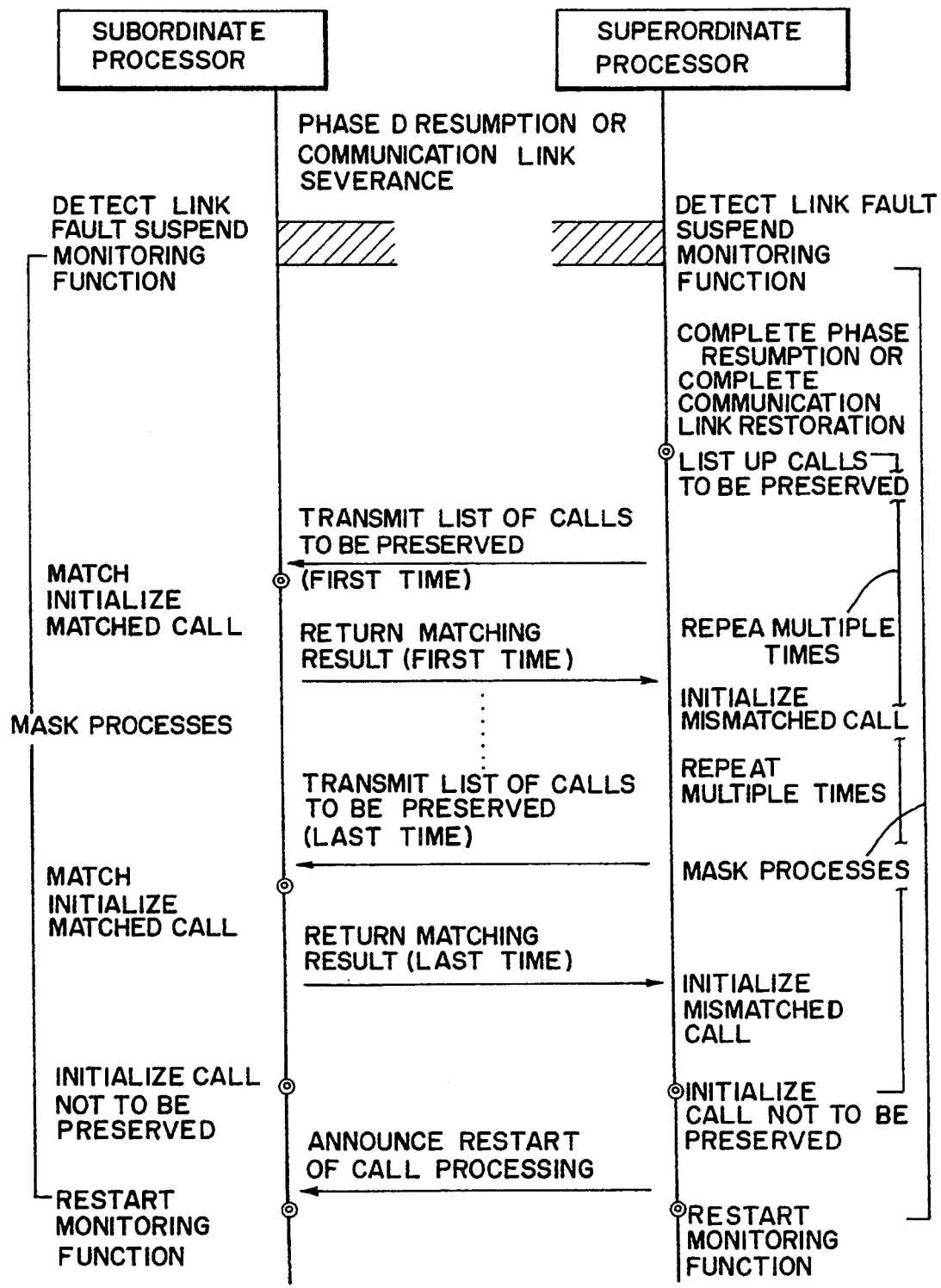
FIG. 3 is a sequence diagram illustrating a conventional call preservation process.
Figure 4:
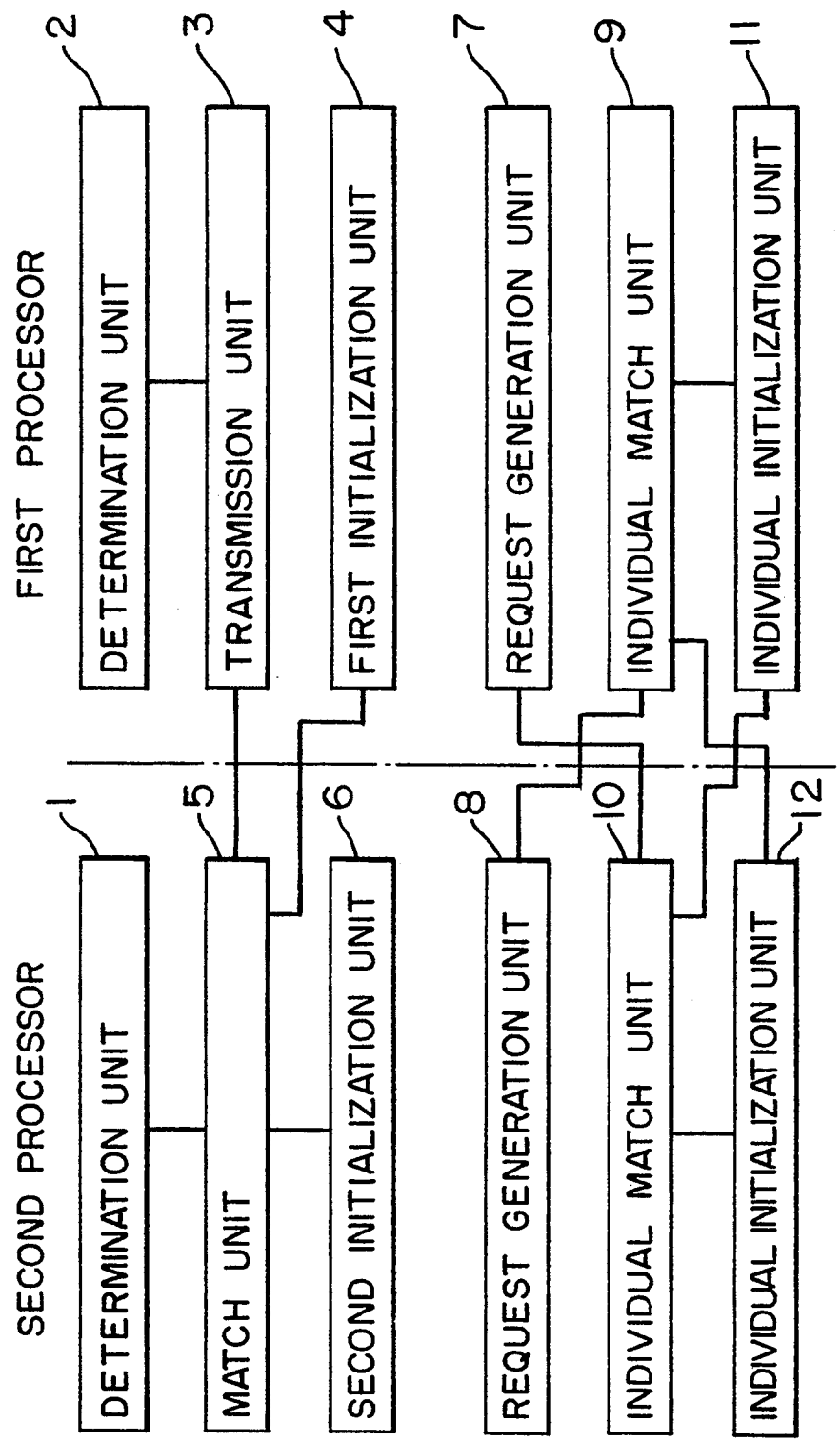
FIG. 4 is a block diagram of a stored program controlled-switching system (SPCS), illustrating underlying principles of this invention.

FIG. 4 is a block diagram of a stored program controlled-switching system (SPCS), illustrating underlying principles of this invention.

The First Form of the Present Invention is as follows:

The first processor of the system shown in FIG. 4 comprises a first determination unit 2, a transmission unit 3 and a first initialization unit 4. The second processor comprises a second determination unit 1, a match unit 5 and a second initialization unit 6.

The first and second determination units 1 and 2 determine whether or not to preserve calls by matching-mismatching of information items of at least two processors after cancelling a call status detected to cause the call information items to be non-matched. The first and second determination units 1 and 2 are active, when the call status has not yet been cancelled, e.g. when a severed communications link was not restored, although they can also remain active even after the severed communications link has been restored.

In the description of the preferred embodiments of this invention, a call in a stable status is deemed as a call to be preserved, which is a call in a "talking" status or in a "ringing" status.

The line processor and the call processor share information on a call and store its status in their respective memories. On receiving a completion of numerical translation, the line processor recognizes an originating line to be in a "talking" status. The call terminating side moves to a "ringing" status after starting a "ringing" control on receiving a call-up request from the call processor and recognizes the "talking" status on a terminating line by detecting an OFF-HOOK event. The call processor similarly has information items separately for the call originating side and the call terminating side, stores a call-up status by using as a trigger a "ringing" request for the line processor and a "talking" status e.g. by an OFF-HOOK event from the line processor or by a response from another office in case of an interoffice call, and uses the call status for detecting a call to be preserved during a call information matching.

All the calls other than that in the above statuses are by definition not to be preserved. Because a non-match status due to a time lag in communications between the call processor and the line processor is not a stable status, the call is defined as not to be preserved.

The transmission unit 3 of the first processor transmits to the second processor a call which is determined as being preserved by matching, after the above status has been cancelled.

The first initialization unit 4 receives from the match unit 5 of the second processor a matching result and initializes a call information corresponding to a matching result that indicates a non-match status.

The transmission unit 3 and the first initialization unit 4 may perform their respective processes by transmitting, in a single communication, information on either a single call or multiple calls.

The number of calls on one of the lists of calls to be preserved can be any of one through n.

The match unit 5 has the call information transmitted by the transmission unit 3 match the call information determined to be preserved by a call information of the second processor, and supplies the result to the first initialization unit 4.

Based on the result from the match unit 5, the second initialization unit 6 initializes a call information not determined to be matching.

It is possible to have the second processor further comprise a unit equivalent to the transmission unit 3 and have the first processor further comprise a unit equivalent to the match unit 5, to enable the respective processors to match mutual call information. This derivative mode brings about an additional efficiency improvement.

The operations of the above described system can be summarized as follows:

When a communications link experiences a fault, the first and second determination units 1 and 2 determine whether or not a call is to be preserved by the call information items held respectively by the first and second processors. The transmission unit 3 transmits a result indicating a call preservation determination to the match unit 5 of the second processor. The match unit 5 compares a received call information with a call information to be preserved by the call information items of the second processor. The match unit 5 then notifies the first processor of a matching result indicating a match or non-match between the information items.

Based on the matching result obtained by the match unit 5, the first initialization unit 4 initializes the particular call information of the first processor, and the second initialization unit 6 initializes the particular call information of the second processor.

The first and second determination units 1 and 2 are active when a communications link is severed, thereby reducing the workloads of respective processors after it is restored.

The Second Form of the Invention is described below as follows:

The first processor comprises a request generation unit 7, an individual match unit 9 and an individual initialization unit 11. The second processor comprises a request generation unit 8, an individual match unit 10 and an individual initialization unit 12.

The request generation units 7 and 8 determine whether or not a call information has already been matching, by detecting a change of statuses, such as an ON-HOOK event and an OFF-HOOK event, a subscriber action immediately after a communications link has been restored from a fault.

On determining that a call information has not been match, request generation unit 7 transmits a matching request to the second processor.

On determining that a call information has not been match, request generation unit 8 transmits a matching request to the first processor.

On receiving the matching request, the individual match units 9 and 10 match call information for an individual subscriber and transmit a result respectively to the second and first processors transmitting the matching request.

Based on a received result and an internally obtained result, the individual initialization units 11 and 12 initialize a call information not determined to be matching.

On determining that a call information has already been matching, request generation unit 7 does not have to transmit a result to the second processor.

On determining that a call information has already been matching, request generation unit 8 does not have to transmit a result to the first processor.

It is possible that the request generation units 7 and 8 may respond respectively to the second and first processors (for starting the individual initialization units 12 and 11), only when they determine a non-match. In such a case, when the request generation units 7 and 8 detect a subscriber action, the individual match units 9 and 10 must delete a non-match indication on determining that a mismatching call information is to be preserved, or must invoke individual initialization units 11 and 12 respectively in the first and second processors on determining that a matching call information is not to be preserved.

The operations of the second form of the present invention can be summarized as follows:

A provision of the request generation units 7 and 8, the individual match units 9 and 10 and the individual initialization units 11 and 12, respectively, in the first and second processors allows a call information to be matched individually in response to a subscriber action.

On receiving a subscriber action, the request generation unit 7 of the first processor outputs, to the second processor, a request for matching an individual call information. On receipt of this request, the individual match unit 10 of the second processor matches an individual call information, determines a match, and notifies the first processor of the result. If the result indicates a non-match between the information items, the individual initialization units 11 and 12 concurrently initialize individual call information items respectively of the first and second processors.

Likewise, on receiving a subscriber action, the request generation unit 8 of the second processor outputs, to the first processor, a request for matching an individual call information. On receipt of this request, the individual match unit 9 of the first processor matches a call information individually, determines a match, and notifies the second processor of the result. If the result indicates a non-match, the individual initialization units 11 and 12 concurrently initialize individual information items held, respectively, by the first and second processors.

Because a subscriber action, e.g. a call organization request, generated individually during a call preservation is processed also individually, the second embodiment of this invention allows the exchange system to start its switching operations immediately after its communications link has been restored from a fault.

The second form of this invention can either operate independently from or in conjunction with the first form (or its derivative mode) of this invention.

PREFERRED EMBODIMENTS OF THE INVENTION

Figure 5:
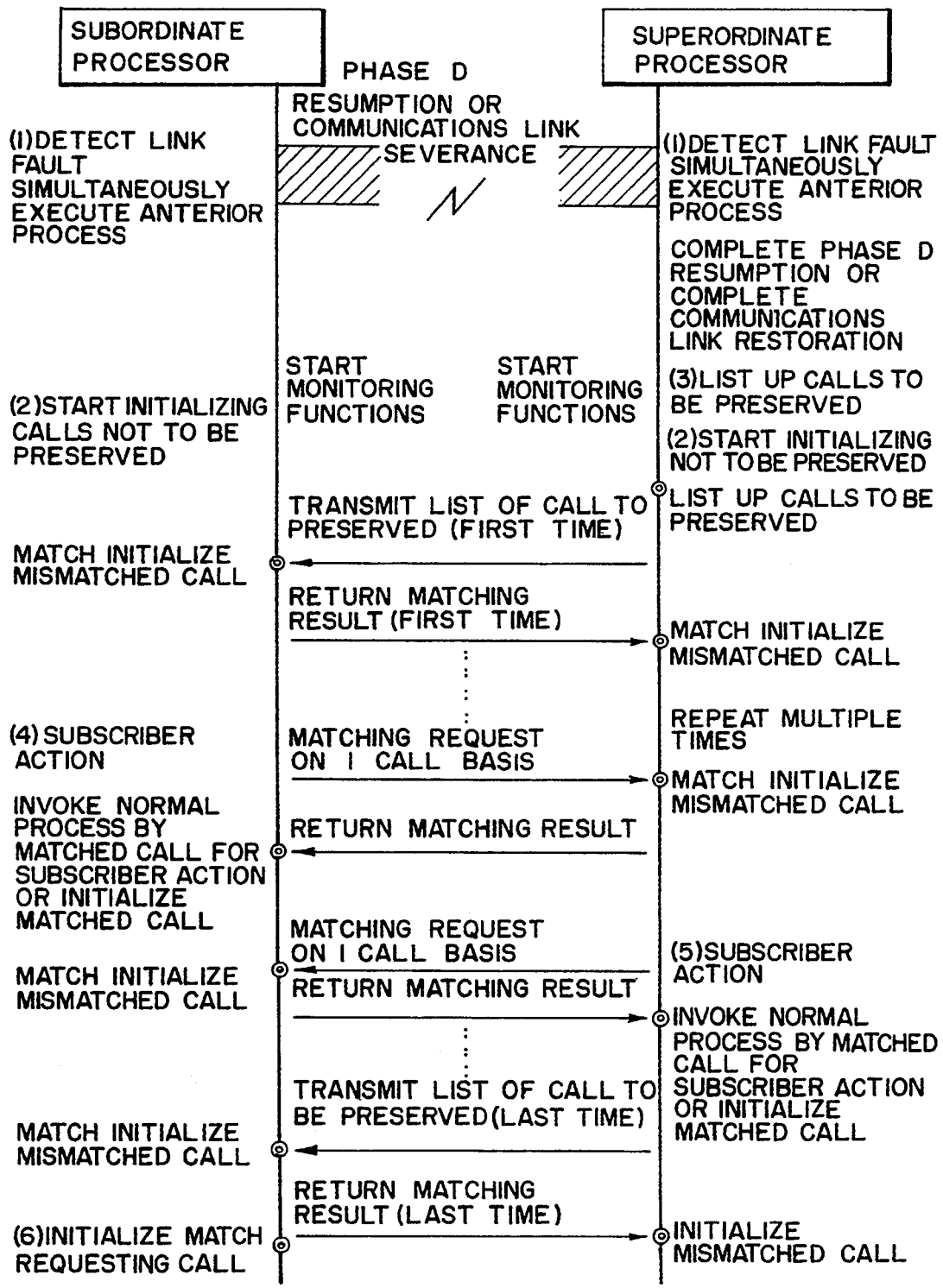
FIG. 5 is a sequence diagram of a first preferred embodiment, illustrating a system for matching a call for preserving a call in parallel with processing a subscriber action.

FIG. 5 is a sequence diagram of a first preferred embodiment of the invention, illustrating a system for matching a call information for preserving a call in parallel with processing a subscriber action.

In the first preferred embodiment, a subordinate processor and a superordinate processor perform an anterior process, a main process and a posterior process in a row, for matching a call information.

A detection of a fault in a communications link (A phase-B/C also causes a temporary fault.) invokes the anterior process, which sets, for each subscriber line, a flag indicating a necessary process in accordance with a subscriber line status. (See [1] in FIG. 5.)

That is, the superordinate processor and the subordinate processor set ON either a match request flag (FMA) indicating a match when a call information is data of a call to be preserved, or a non-preservation flag (FNO) otherwise. They may set these flags only optionally for a subscriber line in an initialized status.

A completion of the anterior process before a restoration of a communications link from a fault allows the superordinate processor and the subordinate processor to resume their normal operations early.

Here, a generation of a match request of a call preservation is detected either by a subscriber action when information items are matched on a single-call basis (for responsively preserving a call on a single-call basis in response to a subscriber action) or by a restoration notice, triggered by a restoration of a communications link from a fault, from functional block for controlling a communications link to a functional block for controlling a call processing signal when the information items are matched on a calls-in-lists basis (for sequentially preserving calls in the lists of calls to be preserved).

For instance, because it takes a certain amount of time before a communications link is restored from a fault, the anterior process has sufficient time to set the match request flag (FMA) or the non-preservation flag (FNO) ON for each subscriber line before the communications link is actually restored.

A memory stores a status of each subscriber line (e.g. a call status), which allows respective processors to set match request flags (FMAs) ON for the calls determined to be preserved. Processors perform a match process to see whether or not their recognitions reconcile with each other. If a call information has already been determined to be of a subscriber line not to be preserved when a match request flag (FMA) is set ON, a non-preservation flag (FNO) is set ON for a call information of a subscriber line not to be preserved, which is subsequently initialized.

Figure 6:
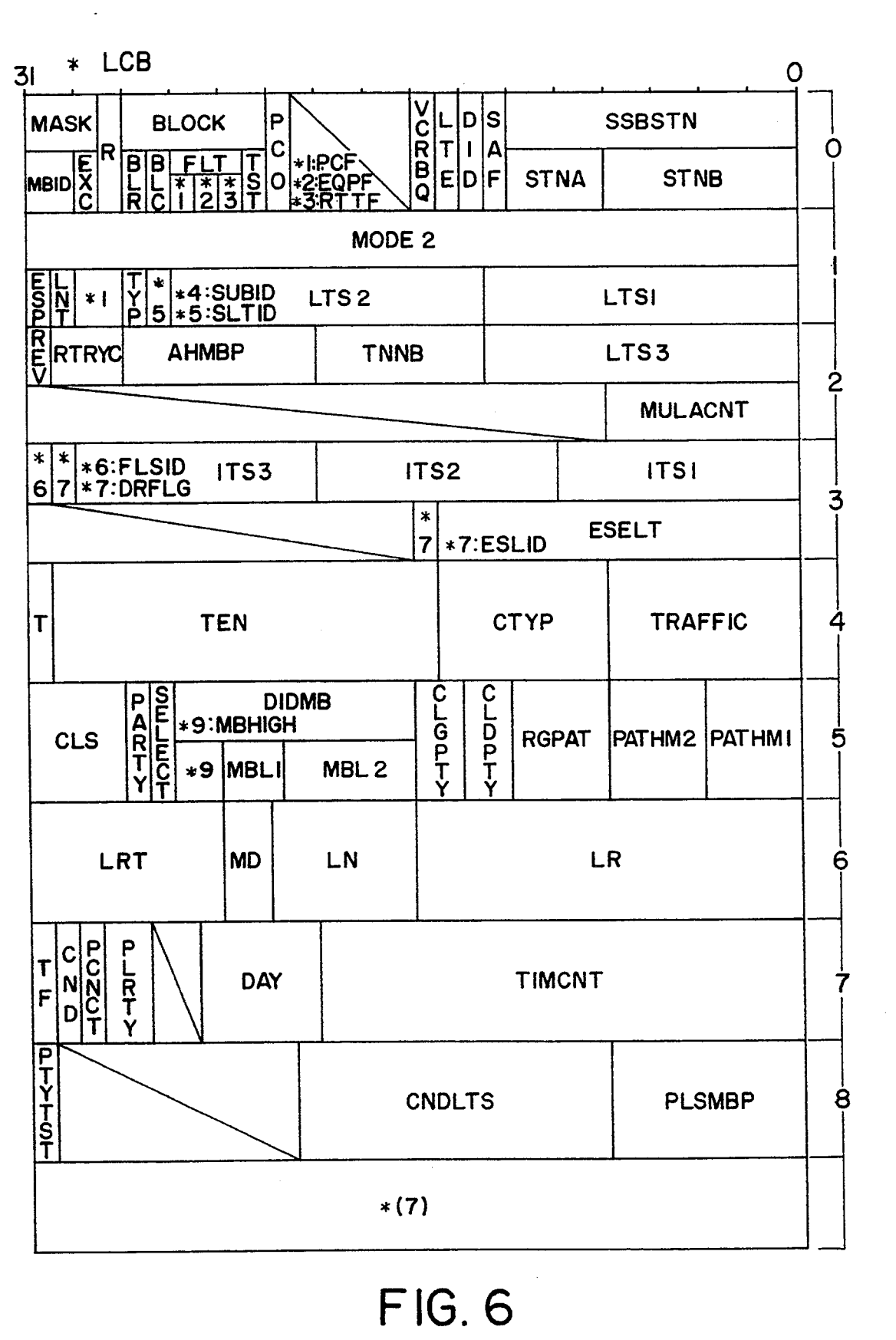

FIG. 6 shows a field structure of a subscriber line control block (LCB).

A table defining acronyms used in FIG. 6 is shown as follows:

```
*SSBSTN ... State Number of a Subscriber
    (Contents: Refer to State Number List)
*STNA ... Call Type Identifier
    0,1: Ordinary Call   (SSBCOR,   SSBCCT,
                          SSBCRL,   SSBCLO)
    2: MULA Call                    SSBMUL
    3: Intra LC Call                SSBILC
    4: Test Call Verification
         Connection                 SSBVRF
    5: BBGFX Call                   SSBFXL
    6: ESEL Call                    SSBESL
    7: Sleeve Lead Call             SSBSLV
    8: DID Call                     SSBDID
    9: SLC 96 Test Call & MODE 2
         Call Acceptance            SSBPGS
*STNB ... Call State Number of STNA
*SAF ... Originating/Terminating Call Identifier
         During Stand Alone Mode
              0/1: NON SA/SA
*DID ... DID Call Identifier
         (Used for Forced Release Processing)
```

```
-continued
*LTE ... Line Test Equipment (LTE) Terminating Flag
*PCO ... Pre-cut State Identifier
         0/1: Not Pre-cut State/Pre-cut State
*BLOCK ... Block Management Identifier
         0/1: Not Blocking State/Blocking State
*FLT ... Fault Blocking Identifier
*RTTF ... Routine Test Block Identifier    1: Blocking
*EQPF ... Equipment Fault Identifier       1: Blocking
*PCF ... Power Cross Fault Identifier      1: Blocking
*TST ... Test Blocking Identifier          1: Blocking
*BLR ... Maintenance Block Identifier      1: Blocking
*BLC ... Block Completion Identifier       1: Blocking
*R ... Call State Rearrangement Bit
         0: Executed    1: To Be Forced Release
*EXC ... Execution Bit
         1: Call Processing Executing
*MBID ... Memory Block Identifier
                   0: Idle
                   1: Used as LCB
                   2: Used as LTCB
*MASK ... Mask Bit
*LTS1 ... SLT Information (Linked with LTCB)
*LTS2, LTS3
    ... SLT Information [Used for Management of
         Multiple SLT Information During
         MULA & Verification Connection]
```

Figure 7:
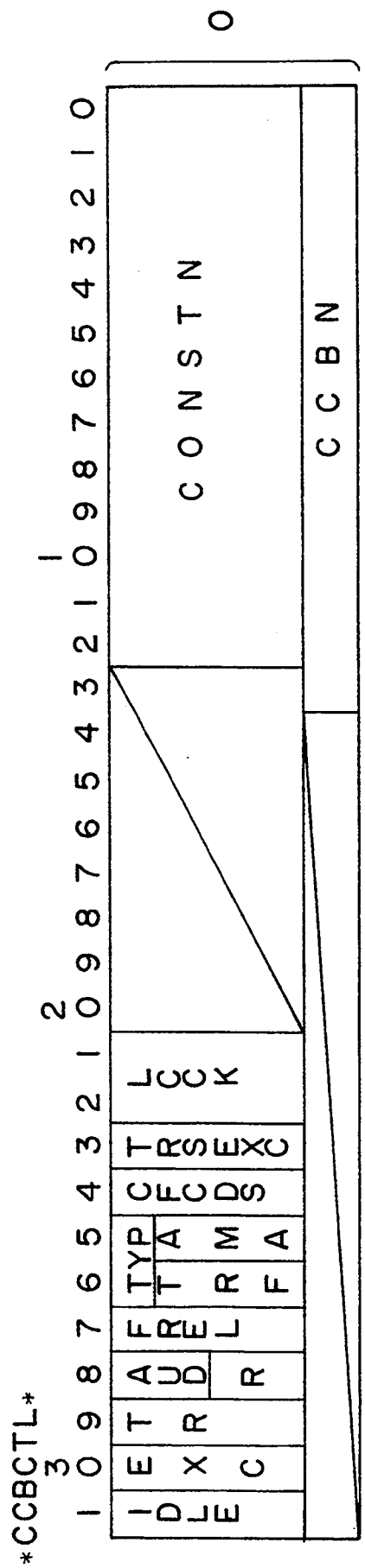
FIG. 7 shows a structure of a CCBCTL in a call control block (CCB)

FIG. 7 shows a structure of a CCBCTL in a call control block (CCB).

The superordinate processor, e.g. a call processor (CPR), and the subordinate processor, e.g. a line processor (LPR), operate as follows:

The subordinate processor detects a change in an SCN signal of a subscriber line, and writes, into a Subscriber Line Control Block (LCB), necessary data as a call information for each subscriber line. The Subscriber Line Control Block has one [1] word comprising thirty-two [32] bits and controls the status of each subscriber line.

According to the value represented by twelve [12] bits of an SSBSTN (State Number of a Subscriber) comprising four [4] bits of an STNA (Call Type Identifier) and eight [8] bits of an STNB (Call State Number of an STNA) in the Subscriber Line Control Block (LCB), both the superordinate processor and the subordinate processor determine whether or not to relieve a call on a calls-in-lists basis. This corresponds to step S2 in the anterior process for a call information matching (shown in FIG. 9) in the first preferred embodiment of this invention.

Also, the superordinate processor receives from the subordinate processor a call processing signal, informing a detection of a call origination, a response and a disconnection. The superordinate processor uses the call processing signal for a numerical translation and a call termination control. Then, the superordinate processor writes, into a Call Control Block (CCB), call data in the call processing signal as a call information of the subordinate processor. The call data are necessary for controlling the call status of the subordinate processor.

More specifically, the superordinate processor controls the call status by the value represented by twelve [12] bits of a CONSTN of the CCBCTL in the CCB, whose one [1] word comprises thirty-two [32] bits. The CONSTN having twelve [12] bits is configured essentially similar to the SSBSTN in the Subscriber Line Control Block (LCB). The SSBSTN and the CONSTN are called information items in the following explanation:

The main process succeeding the afore-described anterior process is explained below:

Immediately after a completion of a phase-B/C resumption or a completion of a communications link restoration, monitoring of a subscriber action begins and the following operations are executed. Here, a communications link (used in the context of "a severed communications link" or "a restoration of a communications link from a fault") carries a signal between a superordinate processor and a subordinate processor. The functional block for controlling a communications link in each processor transmits a fixed pattern periodically for confirming the normality of a communications link.

A desynchronization during a normal operation over a predefined period of time is deemed to be due to a fault in a communications link, whereas a resynchronization during a fault over a predefined period of time is deemed to be a restoration of a communications link from a fault.

First, when a call information matching process for preserving a call causes the main process, both the superordinate processor and the subordinate processor start initializing calls not to be preserved, determine the status of a subscriber line by referring to the lists created in the anterior process, and initialize a call on a subscriber line with a non-preservation flag (FNO) ON. This part of the main process thus allows a new subscriber action regarding a call on a subscriber line with a non-preservation flag (FNO) ON to be attended immediately thereafter. (See [2] in FIG. 5).

Then, the superordinate processor executes a call preservation on a calls-in-lists basis. That is, by referring to the lists created in the anterior process, the superordinate processor determines the status of a subscriber, lists up calls on subscriber lines with their match request flags (FMAs) ON, and preserves calls specified by the lists. Then, in the main process, the superordinate processor sets a match request flag (FMA) OFF for a subscriber line carrying a completely preserved call by call information matching. (See [3] in FIG. 5.) After sequentially matching information items on a calls-in-lists basis, both the superordinate processor and the subordinate processor initialize a non-matched call information.

A processor (either the superordinate processor or the subordinate processor) detecting a status in which a subscriber action during an execution of the call preservation necessitates a call information matching on a single-call basis, first determines whether or not it has completed an information matching for the call.

If the information matching for preserving a call is determined to be incomplete, both processors match statuses related to a call. An attainment of a match causes a call processing in a normal operating mode to be executed, based on the subscriber action. Then, on completion of the call processing in the main process, the both processors set OFF the match request flag (FMA) of a subscriber line carrying a call having completed the call processing.

When they determine that the statuses of subscriber lines produce a call non-matching condition, respective processors begin initializing the non-matched subscriber lines.

Further, if a subscriber action generates a call not to be preserved [having a non-relief flag (FNO) turned ON] and not yet initialized, an initialization of the subscriber line carrying the call enables the call to be accepted for immediate services.

Thus, the superordinate processor and the subordinate processor execute a call processing in the normal operating mode for a subscriber line carrying a call to be preserved, the information on the calls of which has already been matched on a calls-in-lists basis.

A subscriber action under supervision of the subordinate processor or one under supervision of the superordinate processor triggers the call information matching on a single-call basis. (See [4] and [5] in FIG. 5.)

The above procedures shown as [1], [2], and [3] in FIG. 5 are simultaneously executed in parallel.

A functional block for controlling a call processing signal and a functional block for controlling a maintenance operation make the communications link between the superordinate processor and the subordinate processor, e.g. over No. 7 line. The former takes charge of transmitting a request for preserving a call on a single-call basis (due to a small volume of information) and its matching result. The latter takes charge of transmitting a request for preserving a call on a list-in-calls basis and their matching results.

More specifically, an application unit, provided between the superordinate processor and the subordinate processor, compiles request data as necessary, and supplies, to the functional block for controlling a communications link, i.e. a software driver, a communications request together with data specifying a target processor to which a communication is addressed. Then, the software driver controls hardware for transmitting a request for preserving a call to the target processor.

A subscriber action refers e.g. to an OFF-HOOK event or an ON-HOOK event. In case of an SCN/SD control, when the most subordinate processor (which is an LPR in this case) senses a change in an SCN signal over a predefined duration for detecting an OFF-HOOK event or an ON--HOOK event, a subscriber action sets ON a match request flag (FMA) of a call information (stored in memories of the both processors) indicating a call status of a subscriber line.

After the completion of the above-described main process, both, the superordinate processor and the subordinate processor execute a posterior process. Since each processor determines whether or not to preserve a call by using its own call information, there is a possibility that processors have matched information items for different calls. That is, the list-receiving processor may not have completed a call preservation on a calls-in-lists basis. Hence, the processors initialize a call of a subscriber line whose match request flag (FMA) is still ON, even when the call preservation on a calls-in-lists basis has been completed. (See [6] in FIG. 5).

Interactions among respective processors have been explained so far. Described below in further detail are operations of respective processors.

Figure 8:
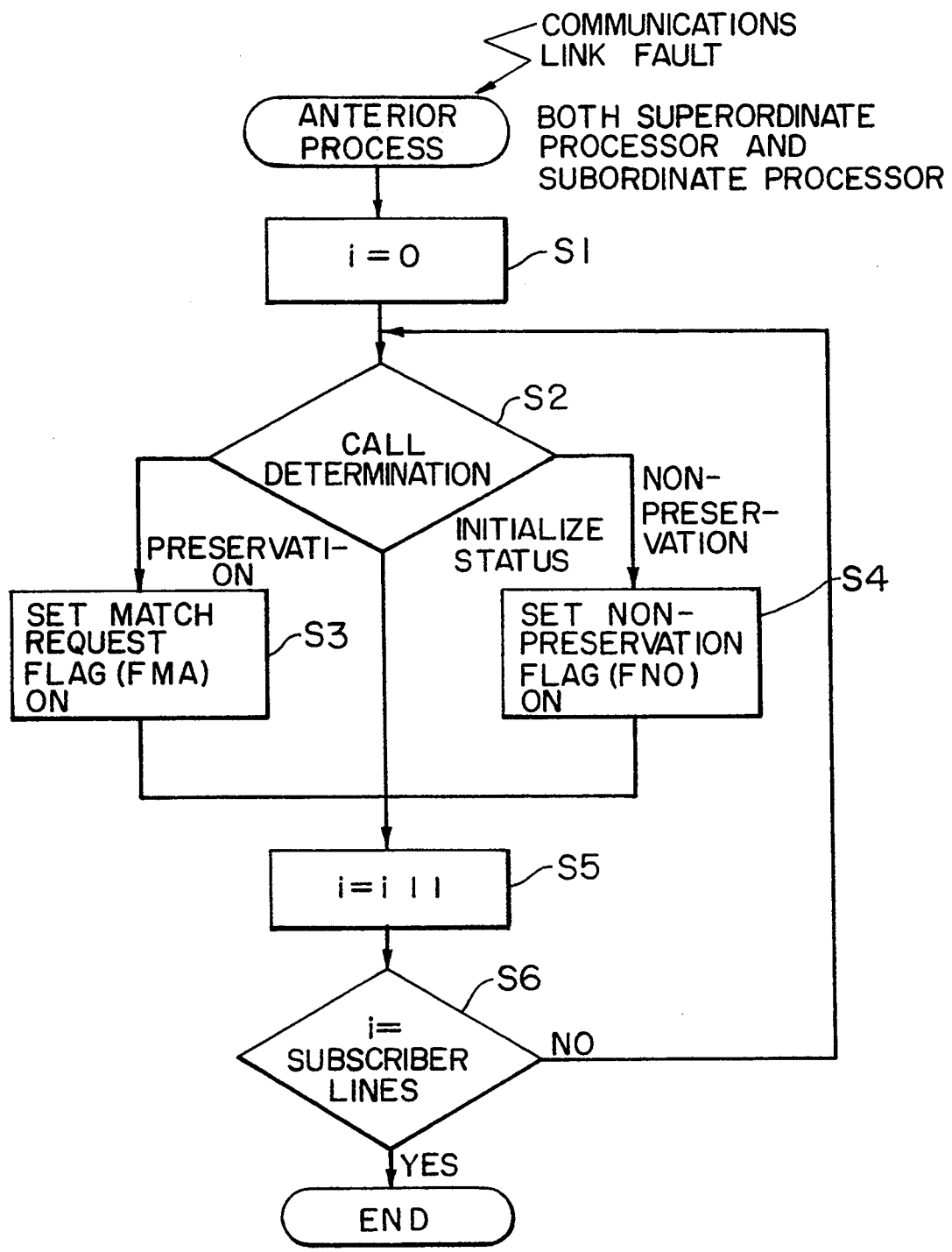
FIG. 8 is a flowchart for the anterior process of the call preservation shown in FIG. 5.

FIG. 8 is a flowchart showing the anterior process of a call preservation by the call information matching shown in FIG. 5.

As with the subordinate processor, the superordinate processor sets ON a match request flag (FMA) of a call information of a subscriber line carrying a call to be preserved, before a communications link is restored from a fault.

Figure 9:
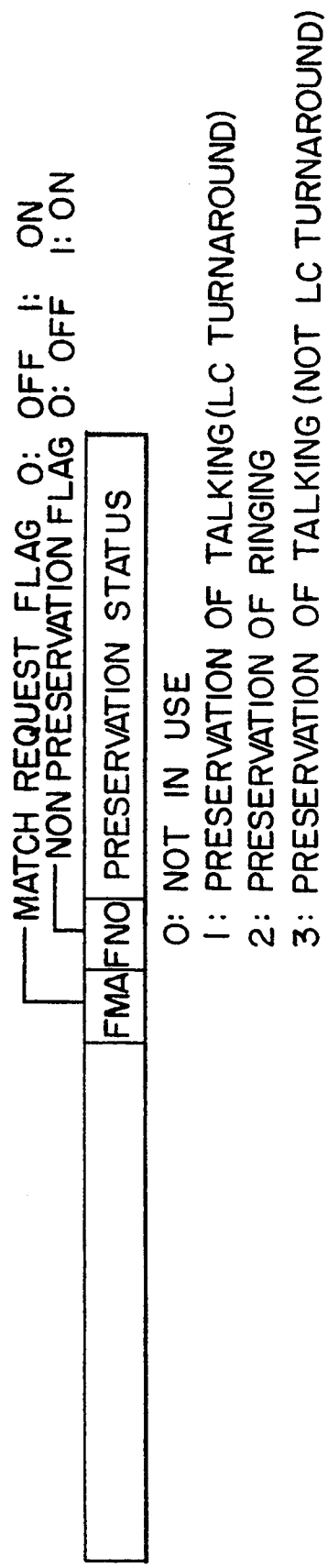
FIG. 9 is a status table for use in creating call preservation information in the anterior process of the call preservation.

A fault occurrence detected from a communications link causes the subordinate processor and the superordinate processor to execute the anterior process shown as steps S1 through S6 in FIG. 9.

A fault occurrence detected from a communications link causes step S1.

In step S1: The superordinate processor and the subordinate processor respectively initialize the value of a certain register i to "zero [0]", and continue to perform step S1.

In step S2: The superordinate processor and the subordinate processor respectively determine whether a subscriber line carrying a call is to be preserved, not to be preserved or in an initialized status, and continue to perform step S3, S4 or S5, respectively.

In step S3: The superordinate processor and the subordinate processor respectively turn a match request flag (FMA) ON, and continue to perform step S5.

In step S4: The superordinate processor and the subordinate processor respectively turn a non-preservation flag (FNO) ON, and continue to perform step S5.

That is, the superordinate processor and the subordinate processor respectively initialize call data after a communications link has been restored from a fault when they determine that a subscriber line carrying a call is not to be preserved in step S2. On the other hand, the superordinate processor and the subordinate processor set no flag when they determine a subscriber line is in an initialized status in step S2.

An initialized status, stored by a corresponding information on a call, refers to an idle status for standing by, for receiving a call origination or a call termination request. Although a call information of a subscriber line in an initialized status is regarded as information on a subscriber line carrying a call which is not to be preserved and is initialized again, it can be put outside a scope of initialization as in this invention. This is because the call processor (CPR) requests an initialization of a subscriber line in response to a non-match condition between the line processor, e.g. in an initialized status, and the call processor e.g. in other than an initialized status.

The superordinate processor and the subordinate processor respectively proceed to perform step S5 after completing the above steps, whatever the result of a determination in step S2 may be.

In step S5: The superordinate processor and the subordinate processor respectively increment by one [1] the value of the certain register i, and continue to perform step S6.

In step S6: The superordinate processor and the subordinate processor respectively determine whether or not the value of i is equal to the number of subscriber lines, and end the anterior process of a call preservation by a call information matching for an affirmative determination (YES) or revert to perform step S2 for a negative determination (NO).

FIG. 9 is a status table for use in creating information on preservation of a call in the anterior process of the call preservation by the call information matching.

Each of the superordinate processor and the subordinate processor stores in its memory a status table in correspondence with each subscriber line.

As described earlier, the anterior process uses the match request flag (FMA) and the non-preservation flag (FNO). Further, when the match request flag (FMA) is turned ON, i.e. when the match request flag (FMA) has a value "one [1]", a preservation status region is referred to. The status region sets its value to 1 for preservation of a "talking" status (in case of other than an LC turnaround).

Figure 10:
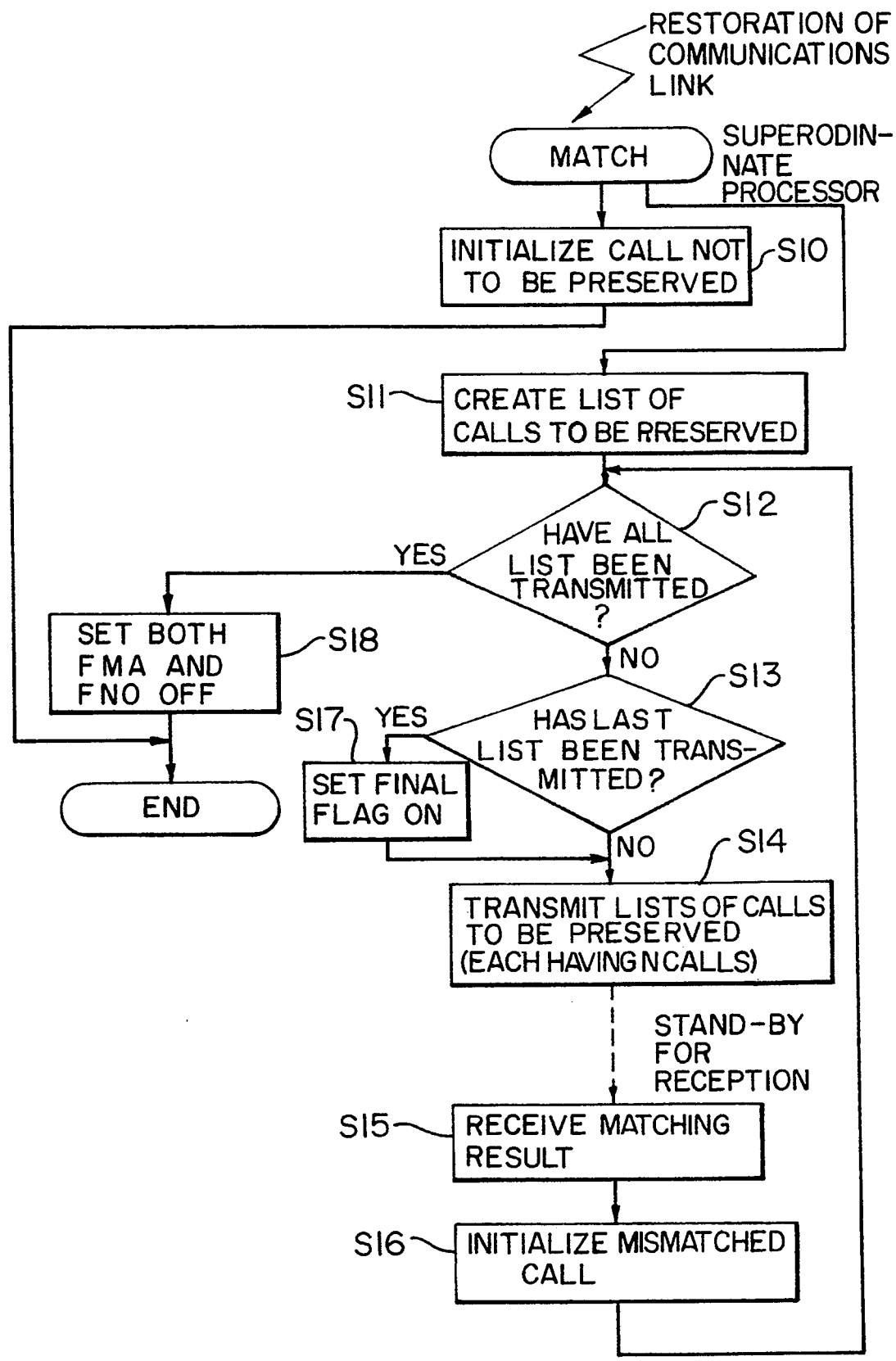
FIG. 10 is a flowchart of the main process of a call preservation by a superordinate processor.

FIG. 10 is a flowchart of the main process of the call preservation by superordinate processor.

The superordinate processor and the subordinate processor having been through with the anterior process of call preservation execute the main process of the call preservation on restoration of a severed communications link.

A communications link restoration invokes a superordinate processor to start performing steps S10 and S11 in parallel.

In step S10: The superordinate processor initializes a call not to be preserved, and ends the main process of the call preservation by the call information matching.

In step S11: Concurrently with performing step S10, the superordinate processor lists up all the calls to be preserved, puts them into lists each containing n calls, and continues to perform step S12.

On receiving from a link controlling block e.g. in the superordinate processor a notification of a restoration of a communications link, the subordinate processor causes its process on data stored in its memory in parallel with the superordinate processor.

The lists of calls to be preserved are created for the superordinate processor to transmit, to the subordinate processor, a match request schedule. Each list contains a certain number of calls to be preserved.

In step S12: The superordinate processor determines whether or not all the lists have been transmitted, and continues to perform step S18 for an affirmative determination (YES) or step S13 for a negative determination (NO). [For instance, a first list emission produces a negative determination in step S12.]

In step S13: The superordinate processor determines whether or not a list being transmitted is a final list to be transmitted, and continues to perform step S14 for a negative determination (NO) or step S17 for an affirmative determination (YES). [For instance, a first list emission produces a negative determination in step S13.]

In step S14: The superordinate processor transmits a list of calls (containing n calls) to be preserved to a subordinate processor, and continues to perform step S15.

The subordinate process matches the calls listed in the list of calls transmitted from the superordinate processor and returns a matching result to the superordinate processor, as will be described later in connection with FIG. 11.

In step S15: The superordinate processor receives the matching result from the subordinate processor, and continues to perform step S16.

In step S16: The superordinate processor initializes a call whose result of matching is NG, i.e. a non-matching call. This allows n calls in the list transmitted in a single period of time to be matched.

The superordinate processor repeatedly performs steps S12 through S16, until finally an affirmative determination (YES) in step S13 causes step S17.

In step S17: The superordinate processor sets a final flag ON, and continues to perform step S14.

The transmission of a list of calls to be preserved in step S14 is the same whether the final flag is OFF or ON. However, the final flag set ON instructs the subordinate processor to terminate its main process of the call preservation by the call information matching, as will be explained later in the description of step S24, shown in FIG. 12.

After the superordinate processor performs step S17, the transmission of all lists of calls to be preserved produces an affirmative determination (YES) in step S12, which causes step S18.

In step S18: The superordinate processor sets both the match request flag (FMA) and the non-preservation flag (FNO) OFF, and ends the main process of the call preservation by the call information matching.

Because the superordinate processor sends all calls for which the preservation is requested, i.e. calls whose match request flags (FMAs) are ON, to the subordinate processor for matching the calls, it does not require the anterior process of the call preservation by the call information matching.

Figure 11:
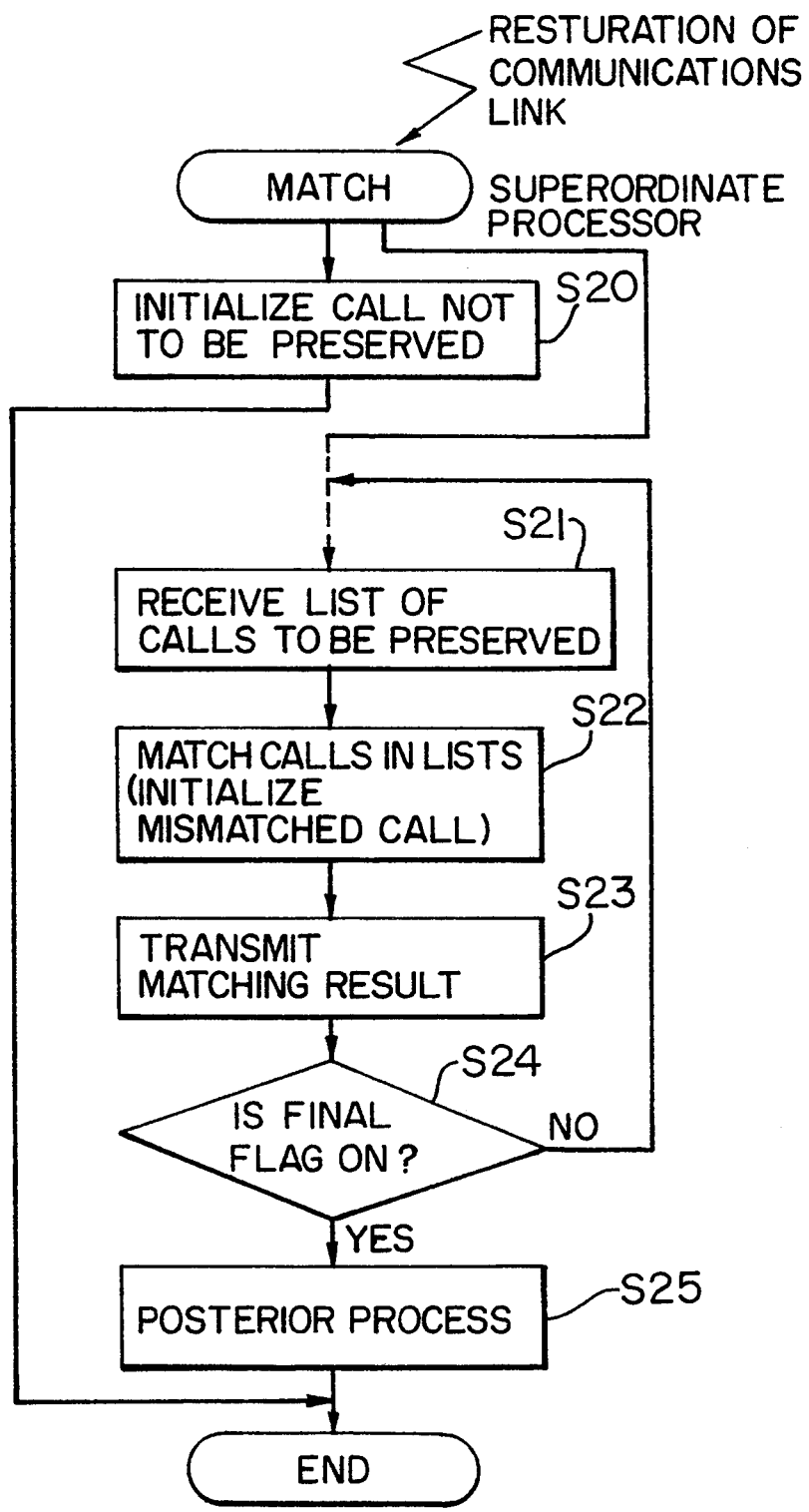
FIG. 11 is a flowchart of the main and posterior processes of a call preservation by a subordinate processor.

FIG. 11 is a flowchart of the main and posterior processes of the call preservation by a subordinate processor.

In FIG. 11, steps S20 through S24 represent the main process of the call preservation, and step S25 represents the posterior process of the same.

In correspondence with the operations of the superordinate processor, the subordinate processor having been through with the anterior process of the call preservation executes the main process of the call preservation on restoration of a severed communications link.

A communications link restoration causes the subordinate processor to start performing steps S20 and S21 in parallel.

In step S20: The subordinate processor initializes a call which is not to be preserved, and ends the main process of the call preservation by call information matching.

In step S21: Concurrently with performing step S20, the subordinate processor stands by for a list (containing n calls) of calls to be preserved- On receiving a list transmitted from the superordinate processor (in step S14 shown in FIG. 11), the subordinate processor continues to perform step S22.

In step S22: The subordinate processor matches call information for preserving a call in the list received in step S21 if it is possible to do so, or initializes calls whose information items do not match, and continues to perform step S23.

In step S23: The subordinate processor transmits a matching result obtained in step S22 to the superordinate processor, which receives it in step S16 shown in FIG. 12.

In step S24: The subordinate processor determines whether or not the list sets its final flag ON, and reverts to perform step S21 for a negative determination (NO) or to step S25 for an affirmative determination (YES).

The subordinate processor stands by for a certain period of time after the transmission of the result of matching (in step S23) up to the moment of the reception of a new list containing n calls (in step S21) from the superordinate processor.

In step S25: The subordinate processor executes a posterior process, thereby initializing a call the preservation of which is requested by the superordinate processor, i.e. a call whose match request flag (FMA) is still ON, even when the information items have completely been matched for all the calls to be preserved in the lists, and ends all the processes for call preservation.

As described above, because the anterior process in particular is executed before, instead of after, a communications link has been restored from a fault, these operations are effective in expediting recovery of normal services.

Also, a subscriber action which takes place during the call preservation on a calls-in-lists basis is matched immediately, thereby executing a response to the subscriber action. Accordingly, in the preferred embodiments of this invention, the call information matching for the call preservation on a single-call basis is executed when at least one [1] subscriber action takes place.

Figure 12:
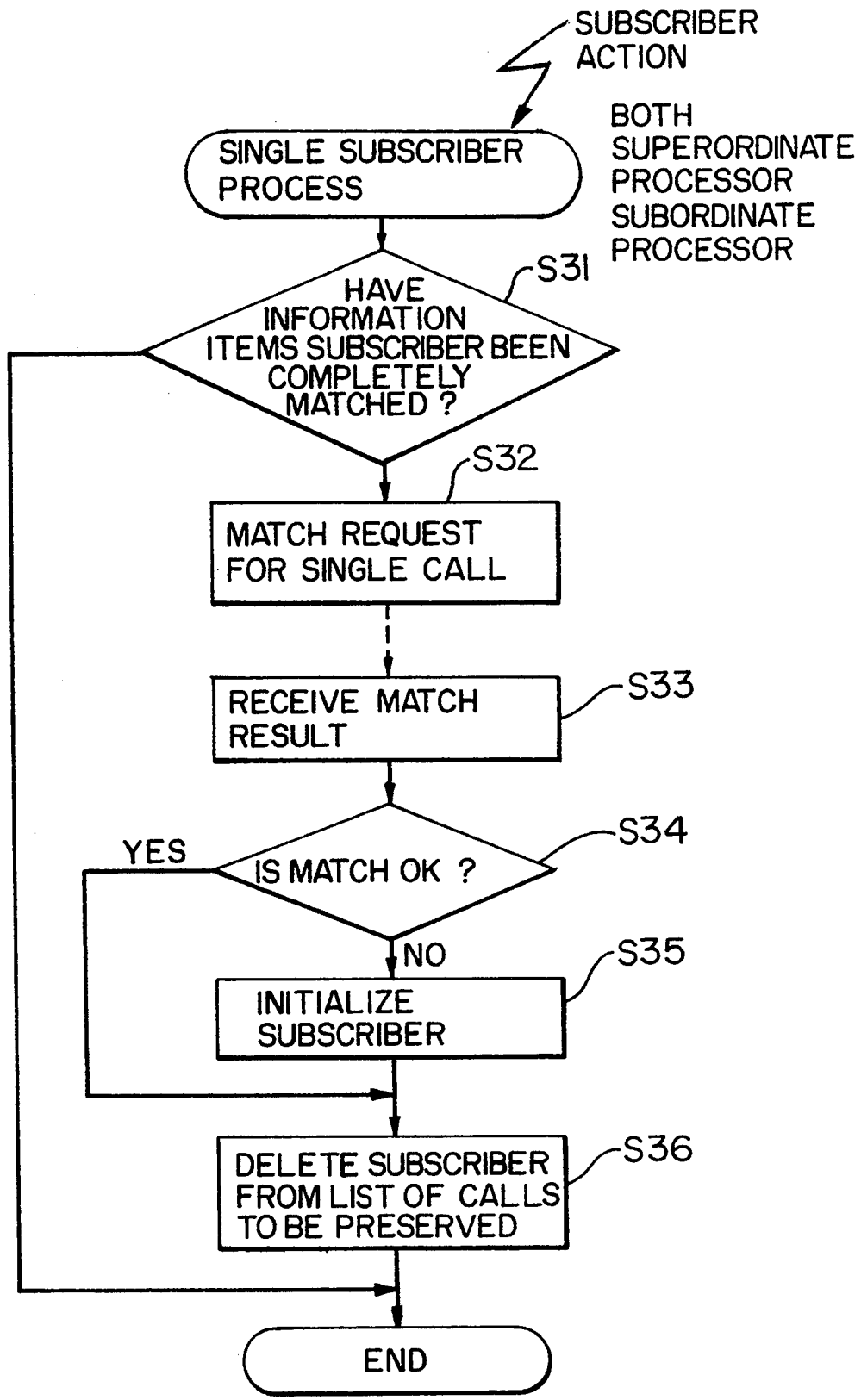
FIG. 12 is a flowchart of a call matching for a call information preservation on a single-call basis by a processor transmiting a matching request.

FIG. 12 is a flowchart of the call information matching for the call preservation on a single-call basis by the processor which transmits a matching request.

Both the superordinate processor and the subordinate processor start their respective processes when a subscriber generates a subscriber action. Generation of the subscriber action causes both, the superordinate processor and the subordinate processor, to start call information matching for the call preservation on a single-call basis, thereby causing the procedure of step S31.

In step S31: The superordinate processor and the subordinate processor respectively determine whether or not a call information by the subscriber action has been completely matched for the call preservation on a single-call basis, continue to perform step S32 for a negative determination (NO) and end the call information matching for the call preservation on a single-call basis for a positive determination (YES).

In step S32: The superordinate processor and the subordinate processor respectively transmit to each other a request for the call information matching for the call preservation on a single-call basis, and continue to perform step S33. (For instance, the subordinate processor receiving a subscriber action transmits a request to the superordinate processor, and the superordinate processor receiving a subscriber action transmits a request to the subordinate processor.)

In step S33: The superordinate processor and the subordinate processor respectively receive from each other a matching result of the call preservation on a single-call basis for the subscriber action, and continue to perform step S34.

In step S34: On receiving from another processor the matching result, the superordinate processor or the subordinate processor respectively determine whether or not the call information matching for the call preservation on a single-call basis of the subscriber action is successful, and continue to perform step S35 for a negative determination (NO) and skip performing step S36 for an affirmative determination (YES).

In step S35: The superordinate processor and the subordinate processor respectively initialize the call on the subscriber line corresponding to the subscriber action and continue to perform step S36.

In step S36: The superordinate processor and the subordinate processor respectively delete from the list of calls to be preserved the call on the subscriber line corresponding to the subscriber action, and end the call information matching for the call preservation on a single-call basis.

The above operations enable a call to be preserved on a single-call basis by the call information matching in response to a subscriber action. Also, as described above the superordinate processor and the subordinate processor respectively match information on the calls in response to a request for preservation of a call on a single-call basis received from the other in step S32 and return the matching result in step S33.

Figure 13:
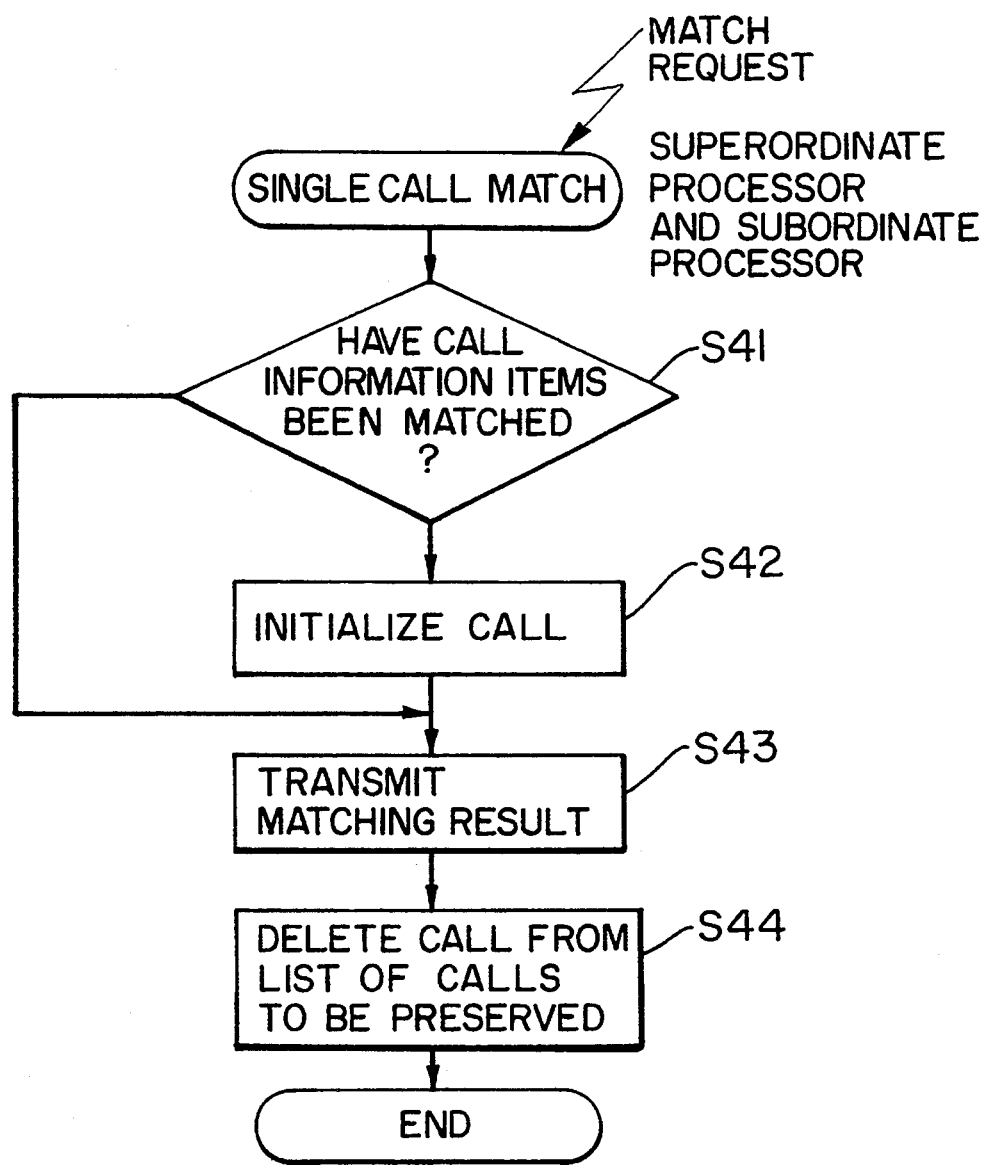
FIG. 13 is a flowchart of a call matching for a call preservation on a single-call basis by a processor receiving a matching request.

FIG. 13 is a flowchart of the call information matching for the call preservation on a single-call basis by the processor receiving a matching request.

Both, the superordinate processor and the subordinate processor start their respective processes when the other processor generates a request for the call information matching for the call preservation on a single-call basis. That is, a receipt from the other processor of a request for the call information matching for the call preservation on a single-call basis causes the receiving processor to start the call information matching on a single-call basis, thereby causing step S41.

In step S41: The superordinate processor and the subordinate processor respectively determine whether or not the call has been completely matched, continue to perform step S42 for a negative determination (NO) and skip to perform step S43 for an affirmative determination (YES).

In step S42: The superordinate processor and the subordinate processor respectively initialize the call on the subscriber line corresponding to the subscriber action and continue to perform step S43.

In step S43: The superordinate processor and the subordinate processor respectively transmit to each other the matching result for the call preservation on a single-call basis, and continue to perform step S44. (For instance, the subordinate processor transmits its matching result to the superordinate processor, and the superordinate processor transmits its matching result to the subordinate processor.)

In step S44: The superordinate processor and the subordinate processor respectively delete the call from the list of calls to be preserved, and end the call information matching for preserving, on a single-call basis, the call on the subscriber action corresponding to the subscriber action.

The above operations enable only the call on the subscriber line generated by the subscriber action during the call preservation on a calls-in-lists basis to be obtained on a single-call basis, thereby expediting the call preservation in response to a subscriber action.

Figure 14:
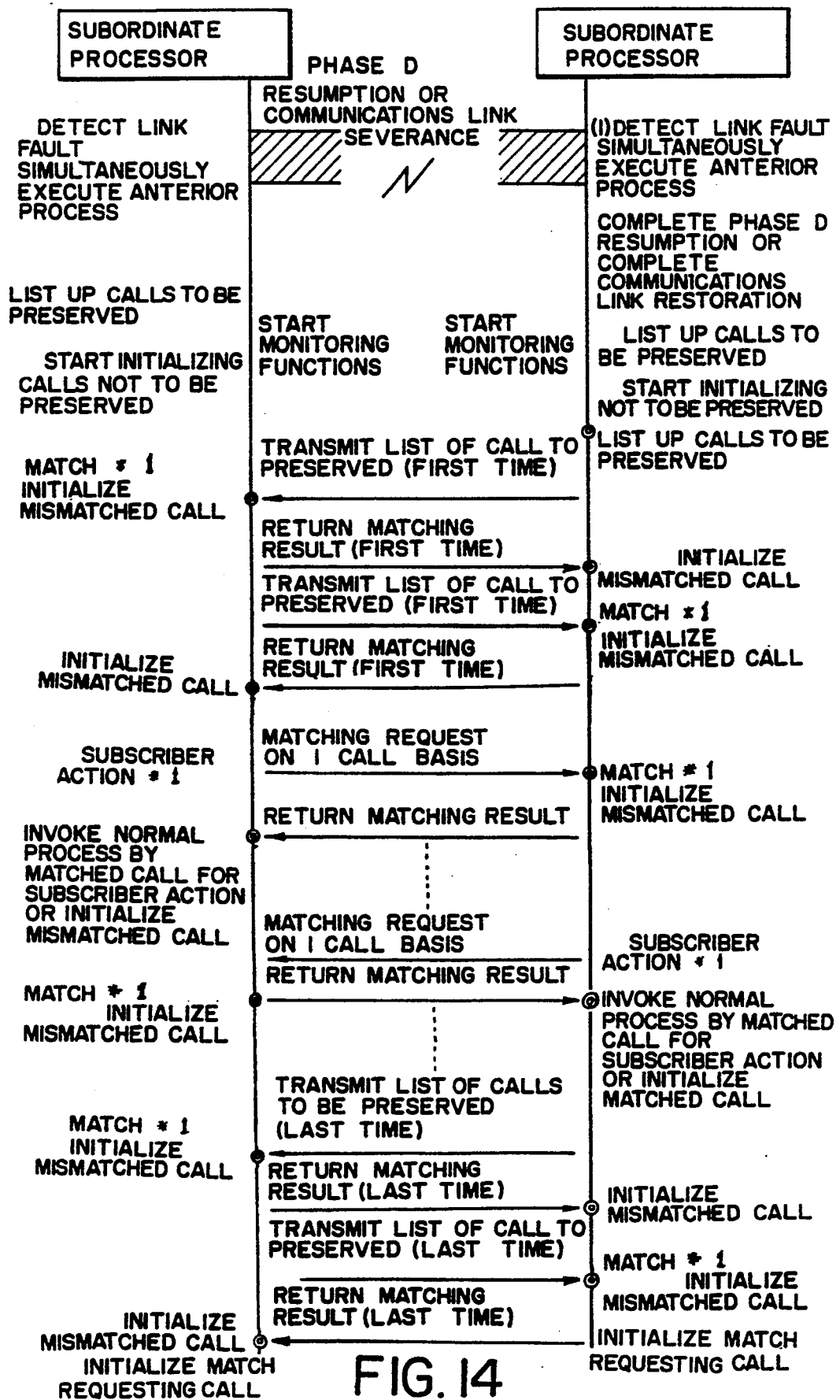
FIG. 14 is a sequence diagram illustrating a call preservation of a second embodiment.

FIG. 14 is a sequence diagram illustrating the call preservation operation of the second embodiment of the invention.

Unlike the sequence of the first embodiment shown in FIG. 5, in which the superordinate processor lists up calls to be preserved and has the subordinate processor match them, the sequence of the second embodiment shown in FIG. 14 is such that both, the superordinate processor and the subordinate processor list up calls to be relieved and mutually exchange their information items e.g. information on n calls at a time. For instance, the superordinate processor begins exchanging its lists of calls to be preserved, starting from the list having the call on the subscriber line having the smallest number and the subordinate processor begins exchanging its lists of calls to be preserved, starting from the list having the call on the subscriber line having the greatest number. Hence, in the second embodiment, the superordinate processor and the subordinate processor can completely match the lists in about half the time as compared to that required in the first embodiment.

The superordinate processor sequentially transmits lists of calls to be preserved, starting from a call having the least number to the subordinate processor, which matches their call informations and returns the matching results. The subordinate processor sequentially transmits lists of calls to be preserved starting from a call having the greatest number, to the superordinate processor, which matches the lists and returns the matching results. Thereafter, both, the superordinate processor and the subordinate processor initialize all calls whose informations do not match.

Although FIG. 14 shows a sequence in which the superordinate processor transmits a list of calls to be preserved to the subordinate processor, which matches the information items of the calls and returns the matching result to the superordinate processor, and then the subordinate processor transmits a list of calls to be preserved to the superordinate processor, which matches the calls and returns the matching result to the subordinate processor, the second embodiment can use a different sequence. For example, the superordinate processor and the subordinate processor may contemporaneously exchange respective lists of calls to be preserved and return respective matching results. This shortens the time required by the respective processors to stand by for the other processor to complete the call information matching for the call preservation. Also, when a subscriber action is generated during the call preservation on a calls-in-lists basis, the call information matching for the call on the subscriber line corresponding to the subscriber action is retained on a single-call basis, as in the first embodiment of this invention.

There is a possibility that information items which do not match despite a match request flag (FMA) being ON remain both, in the superordinate processor and the subordinate processor even after the mutual information matchings. In such a case, the call information, of which the match request flags (FMAs) remain ON are initialized after completing the call preservation in the posterior process.

This invention has been so far described in detail. This invention can be equally applied for matching various kinds of information items, e.g. a block state, in addition to a piece of call information.

That is, information items or pieces stored in the different processors often need to be matched when a communications link between them experiences a fault. A call information matched for preserving a call is only just one example of information pieces, which may be of systems in other fields.

Also, it is possible to ensure contemporaneous parallel processes by eliminating a case in which the call information matching for the call preservation on a single-call basis is executed amid an execution of another information matching for the call preservation on a single-call basis. This can be realized by using a task management for the anterior and main processes of the call information matching on a calls-in-lists basis as well as the call information matching on a single-call basis. The task management selects a task level effective in preventing the call information matching on a single-call basis from being executed simultaneously with the call information matching for the call preservation on a calls-in-lists basis for a certain communications link.

A plurality of factors each triggering a match, which may take place in succession, may cause a plurality of information items or pieces to be matched concurrently. However, this might prevent a call supposed to be preserved, from being actually preserved because of an interference. A task control, i.e. a status control, for sequencing the information matchings in order renders it possible to preserve calls even under such circumstances.

Although the first and second preferred embodiments of this invention assume that the superordinate processor and the subordinate processor correspond respectively to the call processor (CPR) and the line processor (LPR), the application of this invention is by no means limited to such a correspondence but instead can be applicable mutatis mutandis to matchings of information items in other multiprocessor systems.

As explained above, this invention has an advantage of shortening the time required for information matchings, because it enables 60 respective processors to efficiently match information items or pieces.

Furthermore, it has an additional advantage of improving subscriber services, because it enables a subscriber action to be attended immediately after a completion of a phase-B/C resumption or a completion of a communications link restoration without any loss of a call generated by a subscriber action during covering processes unlike in the conventional SPCS.

What is claimed is:

1. An information matching apparatus for use in an exchange having at least a first processor and a second processor, said first processor having stored therein a call information and said second processor having stored therein a call information, the apparatus comprising:

a first determination means, provided in said first processor, for determining whether or not to preserve an unmatched call information by matching it with another call information having a call status different from that of the call information of said first processor, in said second processor, after a recovery from a status producing said unmatched information;

a first request generation means, provided in said first processor, for determining whether or not an information related to a subscriber action has been matched, and for generating a matching request on a single-call basis for matching an information which has not yet been matched for transmitting it to said second processor;

a transmission means, provided in said first processor, for transmitting, to said second processor an information determined by said first determination means to be matched for a preservation;

a first initialization means, provided in said first processor, for receiving a result of matching from said second processor, and for initializing an information corresponding to a result of matching indicating a non-match;

a second determination means, provided in said second processor, for determining whether or not to preserve an unmatched information by matching it with another information having a call status which is different from that of the call information in said second processor, in said first processor, after a recovery from a call status producing said unmatched information;

a second request generation means provided in said second processor, for determining whether or not an information related to a subscriber action has been matched, and for generating a matching request on a single-call basis for matching an information which has not yet been matched for a transmission thereto to said first processor;

a match means, provided in said second processor, for matching an information transmitted from said transmission means with the information determined by said second determination means to be preserved, and for transmitting a result of matching, to said first initialization means in said first processor; and a second initialization means, provided in said second processor, for initializing an information corresponding to said result of matching indicating a non-match obtained by said match means.

2. The information matching apparatus according to claim 1, further comprising:

a first individual match means, provided in said first processor, for receiving a matching request from said second generation means of said second processor, for matching on a single-call basis an information which has not yet been matched, and for returning a result of matching to said second processor;

a first individual initialization means, provided in said first processor, for initializing an information which has not yet been matched, based on said result of matching from said first individual match means and a result of matching from said second processor;

a second individual match means, provided in said second processor, for receiving the matching request from said first request generation means of said first processor, for matching on a single-call basis, an information which has not yet been matched, and for returning a result of matching to said first processor; and a second individual initialization means, provided in said second processor, for initializing an information which has not yet been matched, based on said result of matching from said second individual match means and a result of matching from said first processor.

3. The information matching apparatus according to claim 1, wherein:

said information is call information.

4. The information matching apparatus according to claim 1, wherein:

a fault in a communications link causes said status producing said unmatched information.

5. The information matching apparatus according to claim 1, wherein:

a completion of restoring a communications link produces said recovery from said status producing said unmatched information.

6. The information matching apparatus according to claim 1, wherein:

said match means returns to said first processor only a result of matching indicating a non-match.

7. An information matching apparatus for use in an exchange having at least a first processor and a second processor, each processor having stored therein a call information, the apparatus comprising:

a first determination means, provided in said first processor, for determining whether or not to preserve an unmatched information by matching it with another information having a call status which is different from that of the call information in said first processor, in said second processor, after a recovery from a status producing said unmatched information;

a first request generation means, provided in said first processor, for determining whether or not an information related to a subscriber action has been matched, and for generating a matching revest on a single-call basis for matching an information which has not yet been matched for its transmission to said second processor;

a first transmission means, provided in said first processor, for transmitting, to said second processor an information, determined by said first determination means to be matched for a preservation;

a second transmission means provided in said second processor;

a first match means, provided in said first processor, for matching an information transmitted from said second transmission means with an information determined by said first determination means to be preserved, and for transmitting a result of matching to said second processor;

a first initialization means, provided in said first processor, for receiving said result of matching from said first match means and a result of matching from said second processor, and for initializing an information corresponding to any of said results of matching indicating a non-match;

a second determination means, provided in said second processor, for determining whether or not to preserve an unmatched information by matching it with another information having a call status which is different from that of the call information in said second processor, in said first processor, after a recovery from a status producing an unmatched information;

a second request generation means, provided in said second processor, for determining whether or not an information related to a subscriber action has been matched, and for generating a matching request on a single-call basis for matching an information not yet matched for its emission to said first processor;

said second transmission means, provided in said second processor, transmitting to said second processor an information determined by said second determination means to be matched for a preservation;

a second match means, provided in said second processor, for matching an information transmitted from said first transmission means with an information determined by said second determination means to be preserved, and for transmitting a result of matching to said first initialization means in said first processor; and a second initialization means, provided in said second processor, for receiving said result of matching from said second match means and a result of matching from said first processor, and for initializing an information corresponding to any of said results of matching indicating a non-match.

8. The information matching apparatus according to claim 7, further comprising
   a first individual match means, provided in said first processor, for receiving a matching request from said second processor, for matching, on a single-call basis an information which has not yet been matched, and for returning a result of matching to said second processor;
   a first individual initialization means, provided in said first processor, for initializing an information which has not yet been matched, based on said result of matching from said first individual match means and a result of matching from said second processor;
   a second individual match means, provided in said second processor, for receiving the matching request from said first request generation means of said first processor, for matching, on a single-call basis, an information which has not yet been matched, and for returning a result of matching to said first processor; and a second individual initialization means, provided in said second processor, for initializing an information which has not yet been matched, based on said result of matching from said second individual match means and said result of matching from said first processor.

9. The information matching apparatus according to claim 7, wherein:
   said said information is call information.

10. The information matching apparatus according to claim 7, wherein:
    a fault in a communications link causes said status producing said unmatched information.

11. The information matching apparatus according to claim 7, wherein:
    a completion of restoring a communications link produces said recovery from said status producing said unmatched information.

12. The information matching apparatus according to claim 7, wherein:
    said match means returns to said first processor only a result of matching indicating a non-match.

13. An information matching apparatus for use in an exchange having at least a first processor and a second processor each having stored therein a call information, the apparatus comprising:
    a first request generation means, provided in said first processor, for determining whether or not an information related to a subscriber action has been matched, and for generating a matching request on a single-call basis for matching an information not yet matched for a transmission thereof to said second processor;
    a first individual match means, provided in said first processor, for receiving a matching request from said second processor, for matching on a single-call basis an information not yet matched, and for returning a result of matching to said second processor:
    a first individual initialization means, provided in said first processor, for initializing an information not yet matched, based on said result of matching from said first individual match means and a result of matching from said second processor;
    a second request generation means, provided in said second processor, for determining whether or not an information related to a subscriber action has been matched, and for generating a matching request on a single-call basis for matching an information not yet matched for a transmission thereof to said first processor;
    a second individual match means, provided in said second processor, for receiving a matching request from said first processor, for matching on a single-call basis an information not yet matched, and for returning a result of matching to said first processor; and
    a second individual initialization means, provided in said second processor, for initializating an information not yet matched, based on said result of matching from said second individual match means and a result of matching from said first processor.

14. The information matching apparatus according to claim 13, wherein:
    said information is a call information.

15. The information matching apparatus according to claim 13, wherein:

said subscriber action is at least one of a call origination and a call termination request.

16. An information matching method for use in an exchange having at least a first processor and a second processor, each having a call information stored therein, the method comprising:

a first determination step, performed by said first processor, of determining whether or not to preserve an unmatched information by matching it with another information having a call status which is different from that of the call information in said second processor, in said first processor, after a recovery from a call status producing a an unmatched information;

a first request generation step, performed by said first processor, of determining whether or not an information related to a subscriber action has been matched, and of generating a matching request on a single-call basis for matching an information not yet matched for a transmission thereof to said second processor;

a transmission step, performed by said first processor, of transmitting to said second processor an information determined in said first determination step to be matched for a preservation;

a first initialization step, performed by said first processor, of receiving a result of matching from said second processor, and of initializing an information corresponding to a result of matching indicating a non-match;

a second determination step, performed by said second processor, of determining whether or not to preserve an unmatched information by matching it with another information having a call status which is different from that of the call information in said first processor, in said second processor, after a recovery from a status producing an unmatched information;

a second request generation step, performed by said second processor, for determining whether or not an information related to a subscriber action has been matched, and for generating a matching request on a single-call basis for matching an information not yet matched for a transmission thereof to said first processor;

a match step, performed by said second processor, of matching an information transmitted in said transmission step with an information determined by said second determination step to be preserved, and of transmitting a result of matching for said first initialization step by said first processor; and a second initialization step, performed by said second processor, of initializating an information corresponding to said result of matching indicating a non-match obtained by said match step.

17. The information matching method according to claim 16, further comprising a first individual match step, performed by said first processor, of receiving a matching request from said second processor, of matching on a single-call basis an information not yet matched, and of returning a result of matching to said second processor;

a first individual initialization step, performed by said first processor, of initializing an information not yet matched, based on said result of matching from said second processor;

a second individual match step, performed by said second processor, for receiving a matching request from said first processor, for matching on a single-call basis an information not yet matched, and for returning a result of matching to said first processor; and a second individual initialization step, performed by said second processor, for initializing an information not yet matched, based on said result of matching in said second individual match step and a result of matching from said first processor.

18. An information matching method for use in an exchange having at least a first processor and a second processor each having a call information stored therein, the method comprising:

a first determination step, performed by said first processor, of determining whether or not to preserve an unmatched information by matching it with another information having a call status which is different from that of the call information in said second processor, in said first processor, after a recovery from a call status producing an unmatched information;

a first request generation step, performed by said first processor, of determining whether or not an information related to a subscriber action has been matched, and of generating a matching request on a single-call basis for matching an information not yet matched for a transmission thereof to said second processor;

a first transmission step, performed by said first processor, of transmitting to said second processor an information determined by said first determination step to be matched for a preservation;

a second transmission step performed by said second processor;

a first match step, performed by said first processor, of matching an information transmission from said second transmission step with an information determined by said first determination step to be preserved, and of transmitting a result of matching to said second processor;

a first initialization step, performed by said first processor, of receiving said result of matching in said first match step and a result of matching from said second processor, and of initializing an information corresponding to any of said results of matching indicating a non-match;

a second determination step, performed by said second processor, of determining whether or not to preserve an unmatched information by matching it with another information having a call status which is different from that of the call information in said first processor, in said second processor, after a recovery from a call status producing an unmatched information;

a second request generation step, performed by said second processor, of determining whether or not an information related to a subscriber action has been matched, and of generating a matching request on a single-call basis for matching an information not yet matched for a transmission thereof to said first processor;

said second transmission step, performed by said second processor, transmitting to said second processor an information determined by said second determination step to be matched for a preservation;

a second match step, performed by said second processor, of matching an information transmitted from said first transmission step with an information determined by said second determination step to be preserved, and of transmitting a result of matching to said first initialization step in said first processor; and a second initialization step, performed by said second processor, of receiving said result of matching in said second match step and a result of matching from said first processor, and of initializing an information corresponding to any of said results of matching indicating a non-match.

19. The information matching method according to claim 18, further comprising a first individual match step, performed by said first processor, of receiving a matching request from said second processor, of matching on a single-call basis an information not yet matched, and of returning a result of matching to said second processor;

a first individual initialization step, performed by said first processor, of initializing an information not yet matched, based on said result of matching in said first individual match step and a result of matching from said second processor;

a second individual match step, performed by said second processor, or receiving a matching request from said first processor, of matching on a single-call basis an information not yet matched, and of returning a result of matching to said first processor; and a second individual initialization step, performed by said second processor, of initializing an information not yet matched, based on said result of matching in said second individual match step and a result of matching from said first processor.

20. An information matching method for use in an exchange having at least a first processor and a second processor each having a call information stored therein, the method comprising:

a first request generation step, performed by said first processor, of determining whether or not an information related to a subscriber action has been matched, and of generating a matching request on a single-call basis for matching an information not yet matched for a transmission thereof to said second processor;

a first individual match step, performed by said first processor, of receiving a matching request from said second processor, of matching request from said second processor, of matching on a single-call basis an information not yet matched, and of returning a result of matching to said second processor;

a first individual initialization step, performed by said first processor, of initializing an information not yet matched, based on said result of matching in said first individual match step and a result of matching from said second processor;

a second request generation step, performed by said second processor, of determining whether or not an information related to a subscriber action has been matched, and of generating a matching request on a single-call basis for matching an information not yet matched for a transmission thereof to said first processor;

a second individual match step, performed by said second processor, of receiving a matching request from said first processor, of matching on a single-call basis an information not yet matched, and of returning a result of matching to said first processor; and a second individual initialization step, performed by said second processor, of initializing an information not yet matched, based on said result of matching from said first processor.

* * * * *